United States Patent
Morales et al.

(10) Patent No.: US 12,286,587 B2
(45) Date of Patent: Apr. 29, 2025

(54) FOAM FORMULATION AND ITS USE IN TEMPORARY PIPE PLUGGING

(71) Applicants: Petróleo Brasileiro S.A.—Petrobras, Rio de Janeiro (BR); Universidade Estadual Paulista "Julio De Mesquita Filho"—UNESP, São Paulo (BR)

(72) Inventors: Rone Cesar Morales, Rio de Janeiro (BR); Robinson Antonio Silva, Rio de Janeiro (BR); Sandra Helena Pulcinelli, São Paulo (BR); Edilene Cristina Ferreira, São Paulo (BR); Rodrigo Morais Menezes Dos Santos, São Paulo (BR); Eduardo Pena Dos Santos, São Paulo (BR); Celso Valentim Santilli, São Paulo (BR)

(73) Assignees: Petróleo Brasileiro S.A.—Petrobras, Rio de Janeiro (BR); Universidade Estadual Paulista "Julio De Mesquita Filho" —UNESP, São Paulo (BR)

( * ) Notice: Subject to any disclaimer, the term of this patent is extended or adjusted under 35 U.S.C. 154(b) by 285 days.

(21) Appl. No.: 17/961,227

(22) Filed: Oct. 6, 2022

(65) Prior Publication Data
US 2023/0108336 A1    Apr. 6, 2023

(30) Foreign Application Priority Data

Oct. 6, 2021 (BR) ...................... 10 2021 020133 9

(51) Int. Cl.
  C09K 8/518     (2006.01)
  C09K 8/514     (2006.01)
  E21B 33/12     (2006.01)

(52) U.S. Cl.
  CPC .............. C09K 8/518 (2013.01); C09K 8/514 (2013.01); E21B 33/1208 (2013.01); C09K 2208/10 (2013.01)

(58) Field of Classification Search
  None
  See application file for complete search history.

(56) References Cited

U.S. PATENT DOCUMENTS

2011/0281779 A1* 11/2011 Weerasooriya .... C08G 65/2609
                                                    562/110
2014/0121306 A1*  5/2014 Ton-That .................. C08K 3/10
                                                    106/204.01

(Continued)

FOREIGN PATENT DOCUMENTS

EP            3015429 A1 *  5/2016 ............. C01D 15/02

OTHER PUBLICATIONS

Duan et al. (Oct. 2014) "Evaluation of Oil-tolerant Foam for Enhanced Oil Recovery: Laboratory Study of a System of Oil-tolerant Foaming Agents", Journal of Petroleum Science and Engineering, 122:428-438.

(Continued)

Primary Examiner — John J Figueroa
(74) Attorney, Agent, or Firm — Mintz, Levin, Cohn, Ferris, Glovsky and Popeo, P.C.

(57) ABSTRACT

The present specification refers to a patent of invention for a foam formulation and its use in the temporary plugging of pipes, where the foam has volumetric and time stability, is prepared from a solution containing surfactant, co-surfactant, alkaline substance and LDH nanoparticles, is able to have its viscosity increased over time and remain intact for 8 hours or more even under pressure differences of up to 0.1 bar and a temperature of 60° C. and then it is able to disperse simply by using water or even the fluid transported in the pipeline. The LDH nanoparticle reinforced foam of the (Continued)

present invention can be applied in pipes that need to be plugged when they are undergoing maintenance, either to prevent incandescent soldering splashes from coming into contact with an explosive atmosphere or to avoid contamination in the pipe interior, among other applications. The present invention belongs to (but is not limited to) the field of plugs for pipes with explosive atmospheres and can be applied in systems that require temporary plugs that can be easily remover by using water or another solvent.

9 Claims, 4 Drawing Sheets

(56) References Cited

U.S. PATENT DOCUMENTS

| | | | |
|---|---|---|---|
| 2015/0368811 A1* | 12/2015 | Gray | C25B 1/04 |
| | | | 204/290.01 |
| 2017/0037296 A1* | 2/2017 | Kimura | C09K 8/58 |
| 2017/0044421 A1* | 2/2017 | Parvulescu | C09K 8/58 |
| 2019/0192396 A1* | 6/2019 | Lee | A61P 29/00 |

OTHER PUBLICATIONS

Hinnant et al. (Jun. 5, 2017) "Influence of Fuel on Foam Degradation for Fluorinated and Fluorine-free Foams", Colloids and Surfaces A: Physicochemical and Engineering Aspects, 522:1-18.

Li et al. (Jan. 7, 2016) "Experimental Study of the Stabilization of Co2 Foam by Sodium Dodecyl Sulfate and Hydrophobic Nanoparticles", Industrial & Engineering Chemistry Research, 55(5):1243-1253.

Lu et al. (Feb. 7, 2018) "Preparation and High Temperature Resistance of a Novel Aqueous Foam for Fire Extinguishing", Procedia Engineering, 211:514-520.

Martinez et al. (Jun. 3, 2008) "On the Origin of the Remarkable Stability of Aqueous Foams Stabilised by Nanoparticles: Link With Microscopic Surface Properties", Journal Soft Matter, 4(7):1531-1535.

Tokudome et al. (Apr. 28, 2016) "Layered Double Hydroxide Nanoclusters: Aqueous, Concentrated, Stable, and Catalytically Active Colloids Toward Green Chemistry", ACS Nano, 10(5):5550-5559.

Yang et al. (Apr. 10, 2017) "Foams Stabilized by in Situ-modified Nanoparticles and Anionic Surfactants for Enhanced Oil Recovery", Energy & Fuels, 31(5):4721-4730.

Yekeen et al. (Mar. 2017) "Bulk and Bubble-scale Experimental Studies of Influence of Nanoparticles on Foam Stability", Chinese Journal of Chemical Engineering, 25(3):347-357.

Zhang et al. (Mar. 20, 2008) "Aqueous Foams Stabilized by Laponite and Ctab", Physicochemical and Engineering Aspects, 317(1-3):406-413.

\* cited by examiner

FOAM FORMULATION AND ITS USE IN TEMPORARY PIPE PLUGGING

CROSS-REFERENCE TO RELATED APPLICATION

This application claims priority to Brazilian Application No. 10 2021 020133 9 filed on Oct. 6, 2021, and entitled "FOAM FORMULATION AND ITS USE IN TEMPORARY PIPE PLUGGING" the disclosure of which is incorporated herein by reference in its entirety.

FIELD OF THE INVENTION

The present specification refers to a patent of invention for a foam formulation and its use in the temporary plugging of pipelines. The liquid foam made from a solution of surfactants and nanoparticles has volumetric and temporal stabilities guaranteed by an increase in the viscosity and elastic modulus over time. Such a liquid-gel transition allows the physical/dimensional integrity of the foam to be maintained for 8 hours or more, even under pressure differences of up to 0.1 bar and a temperature of up to 60° C. After use, the foam can be easily removed by washing with water or dispersing in the working fluid. The nanoparticle reinforced foam that is the object of the present patent of invention can be applied in pipes that need to be plugged, when under hot maintenance, either to prevent the flow of explosive gases emanating from the surface of the duct walls or to prevent incandescent solder splashes from contacting the explosive atmosphere existing in the lines for carrying oil and derivatives thereof, or to avoid contamination of the pipeline with undesirable material, dust particles, among others. The present invention belongs (but is not limited) to the field of plugs for pipes with explosive atmospheres, and can be applied in systems that require a temporary plug that can be easily removed by washing with water (for example) or with the fluid that is being transported in the pipe.

BACKGROUND OF THE INVENTION

Pipelines for transporting gas, oil and its derivatives, after having their operations interrupted for an eventual maintenance, being emptied and washed, present residual incrustations of the transported fluid, which release flammable volatiles. This situation mainly arises when there is a lack of steam lines for maintenance, which is the case of most oil platforms. These cumulative volatiles can reach explosive limits during hot maintenance work, such as the top soldering activity aimed at joining these contaminated pipes.

Therefore, the explosive atmosphere has to be separated from the part that will undergo maintenance to avoid the risk of explosion. The devices available on the market for these purposes are balloons, disks or other inflatable bodies that completely obstruct the piping and prevent flammable vapors from advancing towards the part of the piping that is undergoing maintenance. However, this solution is not applicable when the pipeline is devoid of drains or vents close to the point of intervention, that will enable the removal of these physical barriers at the end of the maintenance, making the work difficult or imposing a step of disassembling part of the pipeline to remove the mechanical plugging device.

These limiting factors of the technologies available for plugging liquid and gas fluid transport pipes justify the development of a new concept that is the object of the present invention, which can contribute to reducing the costs associated with the time for repairing pipes and equipment connected to them, the downtime of the lines, as well as increasing occupational and environmental safety during the maintenance period. These aspects motivated the development of physical-chemical plugs that are easy to install and that after use do not need to be removed and can be washed out by the washing or working fluid.

STATE OF THE ART

The article by Duan et al (Duan, X., Hou, J., Cheng, T., Li, S. & Ma, Y. Evaluation of oil-tolerant foam for enhanced oil recovery: Laboratory study of a system of oil-tolerant foaming agents. J. Pet. Sei. Eng. 122, 428-438, 2014) reports the use of aqueous foams having high volumetric stability for use in enhanced oil recovery in mature wells, but the contact with oil component substances strongly decreases the physical stability of these foams. Deficiencies of these formulations have been partially overcome by the application of other components, such as polymeric or inorganic particles. The article by Martinez et al. (Martinez, A. C., Rio, E., Delon, G., Saint-Jalmes, A., Langevin, D., Binks, B. P. On the origin of the remarkable stability of aqueous foams stabilized by nano particles: link with microscopic surface properties Soft Matter 4 (7), 1531-1535, 2008) teaches that the particles added to the foam formulation act by accumulating at the liquid-gas interface in order to increase the lamellae resistance to gas diffusion, in addition to increasing the its rigidity, which is required in the case of injection of foam into a porous mediums. The particles decrease surface tension and capillary pressure, reducing the rate of film thinning and lamella drainage, in addition to increasing the interface viscosity and preventing coalescence of cavities or bubbles.

When the particles are fully hydrophobic, they aggregate within the solution and tend to destabilize the foam, not serving their purpose. The process of particle adsorption at the liquid-gas interface is ensured in the case of partially hydrophobic particles, as seen in the article by Lu et al. (Lu, Y., Wang, T., Pang, M. & Tian, Z. J. Preparation and High Temperature Resistance of a Novel Aqueous Foam for Fire Extinguishing. Procedia Eng. 211, 514-520, 2018). The surfaces of these particles, when hydrophilic, are functionalized with amphiphilic molecules so that the apolar moiety of these molecules is exposed in the solution, while the polar moiety chemically binds to the particle, making it hydrophobic. By changing the particle/functionalizing agent ratio, fully or partially hydrophobic particles are obtained and this grading makes it possible to control the features of the foams thus obtained. Silica nanoparticles having their surfaces modified by reacting SiOH silanols (34%) with dichlorodimethylsilane (65%) were used to generate $N_2$ foam. These foams showed greater stability in the size of the cavities, which increased by 20% over 11 h as compared to a 100% variation within 17 min noticed with the foams obtained with surfactant sodium dodecyl sulfate, SDS, according to the work by Martinez et al.

Another way to modify the hydrophilic/hydrophobic balance is using ionic surfactants having an opposite charge to that of the nanoparticle surface. In this instance, the electrostatic interaction causes the nanoparticles to be coated by a surfactant layer with the apolar moiety facing the solution, as taught in the article by Li et al. (Li, S., Li, Z. & Wang, P. Experimental Study of the Stabilization of $CO_2$ Foam by Sodium Dodecyl Sulfate and Hydrophobic Nanoparticles. Ind. Eng. Chem. Res. 55, 1243-1253, 2016). $CO_2$ foams obtained with silica nanoparticles partially coated with SDS surfactant had their stability and interface properties adjusted by the nanoparticle/surfactant ratio ($SiO_2$/SDS 6:1), reaching a maximum half-life (65 min) for a nanoparticle concentration of 1.0% (w/w), versus a 5 min half-life for samples prepared with SDS alone.

Foams made of a mixture of cationic surfactant (CTAB) and silica exhibited modulated hydrophobicity with the formation of an unsaturated monolayer of surfactant molecules on the surface of the silica nanoparticles, with the contact angle ranging from 130 to 148° for a CTAB concentration of between $0.5 \times 10^{-4}$ and $8.0 \times 10^{-4}$ mol·L$^{-1}$. The concentration of moderately hydrophobic (silica) nanoparticles capable of stabilizing foams ranges from 0.75 to 2% (m/V).

Yekeen et al. (Yekeen, N. et al. Bulk and bubble-scale experimental studies of influence of nanoparticles on foam stability. Chinese J. Chem. Eng. 25, 347-357, 2017) disclose the preparation of foams using silica or alumina nanoparticles ($Al_2O_3$) and SDS, with a maximum half-life of 280 and 150 min (respectively) for a surfactant concentration of 0.3% (m/V) and a nanoparticle concentration of 1% (m/V) versus a 60 min half-life for foams made with SDS alone at the same concentrations.

The particle concentration in solutions used to generate foams ranges between 0.5 and 2% (m/V). The particles used can have a spherical or lamellar shape and dimensions between 12 nm and 770 nm. Silica, alumina, polymer or latex particles are usually used and are associated with ionic surfactants such as sodium dodecyl sulfate (SDS) when they gave a positive surface charge, or cetyltrimethylammonium bromide (CTAB), when they have a negative surface charge, according to what is taught in the article by Hinnant et al. (Hinnant, K. M., Conroy, M. W. & Ananth, R. Influence of fuel on foam degradation for fluorinated and fluorine-free foams. Colloids Surfaces A Physicochem. Eng. Asp. 522, 1-17, 2017).

The use of particles to stabilize foams provided a maximum foam half-life of 4 h and 35 min (for air-made foams), when using 1% (w/v) hydrophilic $SiO_2$ particle and 0.3% (w/v) SDS surfactant, as taught in the article by Yekeen et al. (paragraph 009).

In the instance of foams made of 1% (w/w) lamellar aluminum oxyhydroxide nanoparticles coated with SDS surfactant (Yang, W., Wang, T., Fan, Z., Miao, Q., Deng, Z., & Zhu, Y., Foams Stabilized by in Situ-Modified Nanoparticles and Anionic Surfactants for Enhanced Oil Recovery. Energy and Fuels, 31(5), 4721-4730, 2017) a 50% loss in the foam volume was found to take place within 72 h for a solution containing 0.15% (w/w) SDS.

Disk-shaped laponite nanoparticles ($Na_{0.7}$[($Si_8Mg_{5.5}Li_{0.4}$)$O_{20}(OH)_4$]) coated with CTAB surfactant resulted in foams having a drainage time of up to 1 h when the particle concentration reached 2.0% (w/w) and the surfactant/laponite ratio of 1.75:1, as seen in the work by Zhang et al. (Zhang, S., Lan, Q., Liu, Q., Xu, J., & Sun, D. Aqueous foams stabilized by Laponite and CTAB. Colloids and Surfaces A: Physicochemical and Engineering Aspects, 317(1-3), 406-413, 2008).

Surfactant adsorption on the surface of the nanoparticles to partially cover them favors their accumulation at the liquid-gas interface of the foam, blocking gas diffusion from the interior of the bubbles/cavities and minimizing their collapse, which causes increased foam stability. Despite the efficiency of this foam stabilization mechanism, these formulations are not able to keep the foam volume unchanged for several hours. Accordingly, these formulations do not meet the requirements for them to be used as pipe plugs, where a dimensional variation of 1% in volume is sufficient to allow the passage of gas or vapors from one side of the pipe to the other.

Therefore, there are no products on the market or reports in the state of the art showing the development of foams having sufficient mechanical strength and volumetric stability to plug pipes for hours, with the ability to avoid the contact with an explosive atmosphere generated by dissipated heat during soldering, for example. Accordingly, it is imperative to develop a new type of foam that is stable during the intervention time by the maintenance team and that meets the aforementioned requirements.

Elimination of the transport of flammable gases in the pipeline under maintenance by the $N_2$ foam capable of evolving from a foam-liquid to foam-gel, is a simple and effective concept, which allows hot processing in hydrocarbon transport systems to the safely performed. In addition to being economically feasible, application of plugging foam makes the repair process faster, ensuring the safety of workers when carrying out maintenance work in gas/oil pipeline structures having a complex geometry.

The development of foams with liquid-gel transition was intended to explore the memory effect that allows regeneration of the lamellar structure of double hydroxide (LDH) nanoparticles by contacting calcined LDH with water. Furthermore, the surface of these nanoparticles was functionalized with the surfactant molecules so that the surface would become partially hydrophobic, favoring the build-up of nanoparticles at the liquid-gas interface and promoting foam stability.

Lamellar double hydroxides have had their development accelerated in the last decades of the 20th century, when the combination of two metal ions (a divalent one and a trivalent one) and their counter-ions were found to form lamellar (positively charged) structures made of hydroxides of the metal ions interspersed with counter-ions. These particles had nanometric dimensions, a large surface area and a large ion exchange capacity, which has attracted the interest in the application of these materials as catalysts, controlled drug release devices and adsorbents for environmental remediation.

Several LDH synthesis pathways have been developed, mainly based on coprecipitation reactions, which consisted of mixing sodium hydroxide or sodium carbonate solutions with saline solutions of metal ions.

Titration with sodium hydroxide solution was also used to obtain LDH and the use of urea decomposition reactions was also proposed to induce a gradual increase in the pH of metal ion-containing solutions.

The pathways for obtaining LDH consisted mostly of hydrolysis and condensation reactions with the consequent formation of hydroxides of di- and trivalent metal ions from a saline solution. In general, LDH nanoparticles obtained by precipitation methods have a high state of aggregation making it difficult to disperse the particles. Variations in aging time and temperature were widely used as parameters to control the sized and geometry of the particles and aggregates.

Tokudome et al. (Tokudome, Y., Morimoto, T., Tarutani, N.; Vaz, P. D., Nunes, C. D., Prevot, V.; Stenning, G. B. G., Takahashi, M., Layered Double Hydroxide Nanoclusters: Aqueous, Concentrated, Stable, and Catalytically Active Colloids toward Green Chemistry ACS Nano 10 (5), 5550-5559, 2016) have proposed a pathway based on the sol-gel process, which allows one to control reactions of forming LDH sols and gels by using a complexing agent acetylacetone (ACAC) to delay the hydrolysis/condensation and its subsequent precipitation in the form of LDH sol. This pathway employs propylene oxide (PO) as a $H^+$ ion scavenger, providing for a continuous increase in pH and the obtaining of nanoparticles of controlled size and low aggregation levels.

During the development of these foams the addition of LDH nanoparticles in the aqueous solution containing the surfactant ammonium palmitate, sodium palmitate or triethanolammonium was found to cause increased viscosity of the elastic modulus, transforming the precursor foam liquid into a solid (after approximately 1 h). Therefore, this formulation can be used to prepare liquid foams that transform into solid foams and is shown to be very interesting for application as pipe plugs, among others.

During the development of the foam formulation of the present invention the increase in viscosity was found to be caused by the intercalation of surfactant molecules between the lamellae, the surfactant having the opposite charge to that of the surface of the metal double hydroxide lamellae. This gives rise to a double layer of surfactant in the interlamellar gallery, where the polar moiety of the molecule is facing the particle surface and the apolar moiety is facing the apolar moiety of the other surfactant molecule, which is adhered to the surface of the opposite lamella. Intercalation of surfactant molecules causes an increase in the interlamellar distance, since the length of the surfactant molecules is much greater than the size of the counter-ions present in the LDH. It causes a considerable increase in the volume fraction of the particles, increasing viscosity of the solution where they are included.

Such an increase in viscosity of the foam precursor solution with time in the presence of nanoparticles has not yet been reported in the state of the art, nor is the use of LDH nanoparticles for this purpose, demonstrating the innovative character of the present invention.

BRIEF DESCRIPTION OF THE INVENTION

Water-based foams composed of surfactant, co-surfactant and LDH nanoparticles were obtained in the present invention, which can increase viscosity with time, becoming structurally and volumetrically stable for more than 8 h at temperatures of up to 60° C. and being resistant to pressure differences of up to 0.1 atm.

The foam is achieved from the hot mixture of surfactant and co-surfactant with water, then the surfactant and co-surfactant (when acidic) are converted into salt from an acid-base reaction using a strong base (NaOH) or a weak base ($NH_4OH$ or triethanolamine) or a mixture thereof or the like. After cooling, the solution is mixed with the LDH dispersion in an aqueous medium. Thereafter, the foam is prepared either by stirring or by gas injection.

At the moment of its preparation, the obtained foam can be applied in pipes acting as a plug to prevent the passage of hydrocarbon vapors or the entry of dirt into the pipe, and the plug can be removed after use simply by passing water or steam through the system or even by the action of the working fluid (oil).

BRIEF DESCRIPTION OF THE FIGURES

To obtain a full and complete visualization of the object of the present invention, figures containing references are presented, as follows.

(FIG. 5A) after foam formation, (FIG. 5B) after 1 h.

DETAILED DESCRIPTION OF THE INVENTION

Embodiments of the foam for temporarily plugging pipes will be presented below and then the mode of preparation of the foam forming liquid (FFL), LDH and foam formation will be described, in addition to its use as a plug in pipes, the foam formulation and its use being a temporary plug for pipes, which are the objects of the present patent of invention. It is noteworthy that for formulating the foam, there is proposed a pathway for preparing FFL with different formulations and then a pathway for forming the foam. The formulations result in foam capable of plugging the pipe for over 8 h with resistance to pressure differences of up to 0.1 bar.

Preparation of the Foam Forming Liquid (FFL)

Figure 1A:
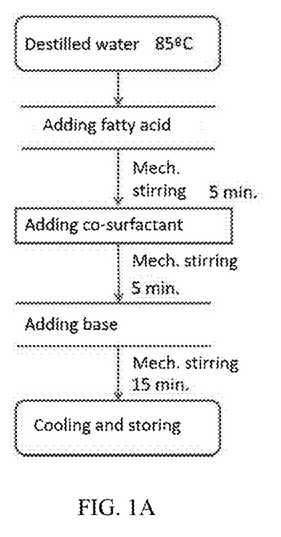
FIGS. 1A-1C schematically show the preparation of the foam forming liquid (FFL) (FIG. 1A), the preparation of LDH (FIG. 1B) and the preparation of FFL with LDH foam (FIG. 1C).

In one embodiment, the method of preparing the foam forming liquid (FFL) consisted of the following steps (FIG. 1A):

a) Adding 7.9% (w/w) (0.26 mol) palmitic acid under stirring to a container containing 86.4% (864 mL) distilled water at 85° C.;
b) Stirring for 5 min keeping the temperature at 85° C.;
c) Adding 0.8% (w/w) (0.01 mol) ethoxylated lauryl ether glycolic acid co-surfactant (Laureth-11), stirring for 5 min while keeping the temperature at 85° C.;
d) Adding 4.9% (w/w) (0.27 mol) triethanolamine base under stirring and agitate for 15 min.
e) Allowing to cool and storing in a closed glass vessel.

In another embodiment, the method of preparing the foam forming liquid (FFL) consisted of the following steps:

a) Adding 7.9% (w/w) (0.26 mol) palmitic acid under stirring to a container containing 86.4% (864 mL) distilled water at 85° C.;
b) Stirring for 5 min, keeping the temperature at 85° C.;
c) Adding 0.8% (w/w) (0.01 mol) ethoxylated lauryl ether glycolic acid co-surfactant (Laureth-11), stirring for 5 min while keeping the temperature at 85° C.;
d) Adding 4.9% (w/w) (0.06 mol) ammonium hydroxide base under stirring and agitate for 15 min.
e) Allowing to cool and storing in a closed glass vessel.

In another embodiment, the method of preparing the foam forming liquid (FFL) consisted of the following steps:
a) Adding 7.9% (w/w) (0.26 mol) palmitic acid under stirring to a container with 86.4% (864 mL) distilled water at 85° C.;
b) Stirring for 5 min, keeping the temperature at 85° C.;
c) Adding 0.8% (w/w) (0.01 mol) ethoxylated lauryl ether glycolic acid co-surfactant (Laureth-11), stirring for 5 min while keeping the temperature at 85° C.;
d) Adding 4.9% (w/w) (0.02 mol) sodium hydroxide base under stirring and agitate for 15 min.
e) Allowing to cool to room temperature and storing in a closed vial.

In another embodiment, the method of preparing the foam forming liquid (FFL) consisted of the following steps:
a) Adding 7.9% (w/w) (0.26 mol) palmitic acid under stirring to a container with 86.4% (864 mL) distilled water at 85° C.;
b) Stirring for 5 min while keeping the temperature at 85° C.;
c) Adding 0.8% (w/w) (0.01 mol) BRIJ-56 co-surfactant, stirring for 5 min while keeping the temperature at 85° C.;
d) Adding 4.9% (w/w) (0.26 mol) triethanolamine base under stirring and agitate for 15 min.
e) Allowing to cool and storing in a closed glass vessel.

In another embodiment the method of preparing FFL consisted of the following steps:
a) Adding 0.26 mol soy fatty acid under stirring to a flask containing 845 mL distilled water at 85° C.;
b) Stirring for 5 min while keeping the temperature at 85° C.;
c) Adding 0.01 mol BRIJ-56 co-surfactant and stir for 5 min while keeping the temperature at 85° C.;
d) Under stirring, add 0.26 mol triethanolamine, stir for 15 min.
e) Allowing to cool and storing in a closed glass vessel.

In another embodiment the method of preparing FFL consisted of the following steps:
a) Adding 0.26 mol soy fatty acid under stirring to a flask containing 845 mL distilled water at 85° C.;
b) Stirring for 5 min while keeping the temperature at 85° C.;
c) Adding 0.01 mol BRIJ 56 co-surfactant and stir for 5 min while keeping the temperature at 85° C.;
d) Under stirring, adding 0.03 mol $NH_4OH$ and 0.23 mol triethanolamine and stir for 15 min.
e) Allowing to cool and storing in a closed glass vessel.

Further fatty acids may be added in place of palmitic acid, such as linoleic, oleic or stearic acids, or a mixture thereof (distilled soy fatty acid) or the like.

The co-surfactant Laureth-11 can be replaced by polyethylene glycol hexadecyl ether (BRIJ-58), polyoxyethylene (10)cetyl ether (BRIJ-56), polyoxyethylene (23)lauryl ether (Laureth-23) or a mixture thereof or the like.

Other bases can be added in place of triethanolamine such as sodium or ammonium hydroxides or the like, or a mixture of these bases.

Preparation of LDH Sol

Figure 1B:
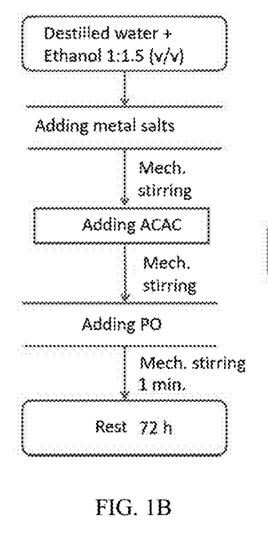

In one embodiment, the method of preparing lamellar double hydroxides (LDH) consisted of the following steps (FIG. 1B):
a) Adding a mixture of zinc chloride (342 mg, 2.5 mmol) and aluminum chloride (302 mg, 1.25 mmol) in 2.5 mL water/ethanol solution at a 1:1.5 ratio (v/v) in order to obtain a cations concentration of 1.0 $mol·L^{-1}$.
b) Adding 131 µL (1.25 mmol) acetylacetone (acac) under mechanical stirring and then;
c) 1.31 mL (18.75 mmol) propylene oxide (PO) under stirring for another 1 min.
d) Closing the reaction flask and keeping the sample for 72 h at 25° C. The concentrated nanoparticle suspension contains about 10% (m/v) LDH.

In another embodiment, the method of preparing lamellar double hydroxides (LDH) consisted of the following steps:
a) Adding a mixture of nickel nitrate (1.5 mmol), magnesium nitrate (1.0 mmol) and aluminum nitrate (1.25 mmol) in 2.5 mL of a water/ethanol solution at a 1:1 ratio, 5 (v/v) in order to achieve a cation concentration of 1.0 $mol·L^{-1}$.
b) Adding 131 µL (1.25 mmol) acetylacetone (acac) under mechanical stirring and then;
c) 1.31 mL (18.75 mmol) propylene oxide (PO) under stirring for another 1 min.
d) Closing the reaction flask and keeping the sample for 72 h at 25° C. The concentrated nanoparticle suspension contains about 10% (m/v) LDH.

Other metallic salts can be used, such as zinc, copper, tin nitrates, or chlorides of these metals, or other equivalents.

Preparation of foam with LDH

Figure 1C:
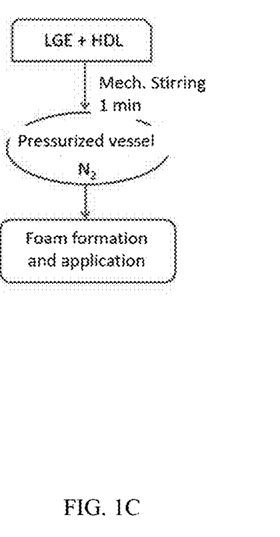

In one embodiment, the method of preparing the LDH-containing foam consists of the following steps (FIG. 1C):
a) Adding 83.8 mL FFL in a flask:
b) Adding, under magnetic stirring, 16.2 mL of a LDH suspension;
c) Stirring for another 1 min;
d) Adding the mixture to the foam forming system.

The resulting mixture has 1.5% (w/w) nanoparticles.

In another embodiment, a foam solution having a nanoparticle concentration of 0.5% was prepared, according to the following steps:
a) Adding 83.8 mL FFL to a flask;
b) Adding, under magnetic stirring, 10.8 mL of distilled water;
c) Adding, under magnetic stirring, 5.4 mL of a LDH suspension;
d) Stirring for another 1 min;
e) Adding the mixture to the foam forming system.

Foam Formulation Compositions

The present invention is characterized by being made of a surfactant or a mixture of surfactants, a co-surfactant or a mixture of co-surfactants, a base or a mixture of bases and LDH nanoparticles (of inverse surface charge to that of the surfactant ion) responsible for the programmed increase in viscosity and elastic modulus of the initial liquid foam.

The invention consists of formulating a foam containing fatty acid preferably at a concentration between 0.09 and 0.54 $mol·L^{-1}$, more preferably at a concentration between 0.15 and 0.40 $mol·L^{-1}$, most preferably at a concentration between 0.20 and 0.30 $mol·L^{-1}$. The foam further contains acid or ethoxylated hydrocarbon alcohol, preferably at a concentration between 0.001 and 0.060 $mol·L^{-1}$, more preferably at a concentration between 0.005 and 0.020 mol·L$^{-1}$ and most preferably at a concentration between 0.008 and 0.012 mol·L$^{-1}$. The foam further contains a base that acts to form the ionic surfactant (and co-surfactant) that is present in a concentration that ranges preferably between 0.009 and 0.84 mol·L$^{-1}$, more preferably between 0.018 and 0.36 mol·L$^{-1}$, most preferably between 0.02 and 0.30 mol·L$^{-1}$. Finally, foam precursor solutions having LDH concentrations preferably ranging between 0.5 and 3% (w/w), more preferably between 1 and 2%, most preferably between 1.25 and 1.75% can be prepared.

The surfactant precursor is from the class of fatty acids of the $C_mH_nCOOH$ type, with $15 \leq m \leq 17$ and $31 \leq n \leq 33$, such as palmitic acid, linoleic acid, oleic acid and linolenic acid, or a mixture thereof. The co-surfactant belongs to the class of alcohols or glycolic acids of the ethoxylated lauryl ether type or a mixture thereof, of the $R_1C_xH_y(C_2H_4O)_zR$ type, where $12 \leq x \leq 16$, $27 \leq y \leq 31$, $10 \leq z \leq 21$, $R_1$ being H or O and $R_2$ being the alcohol, carboxylic acid or ether function ($-CH_2OH$, $-CH_2COOH$ or $-OC_2H_5$), such as Laureth-11, Brij-58, Brij-56 or Laureth-23. The pH adjusting agent is a (strong or weak) base, such as sodium hydroxide, ammonium hydroxide or triethanolamine, or a mixture thereof. The nanoparticles are double lamellar hydroxides, in this instance, made of lamellae of a mixture of aluminum oxyhydroxide and zinc oxyhydroxide. LDH nanoparticles can also be made of a mixture of aluminum, nickel and magnesium oxyhydroxide, or any other LDH-forming mixtures, whose surface has a positive charge or a charge that i inverse to that of the surfactant ion in solution.

Features of the New LDH-Containing Foam Formulation

Figure 2A:
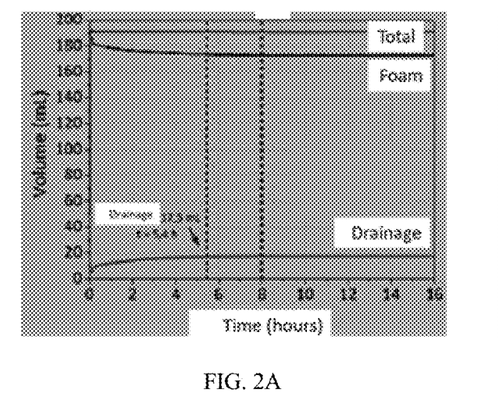
FIGS. 2A and 2B show the variation in foam volume and drainage over time for samples prepared with surfactant ammonium palmitate, ethoxylated ammonium lauryl ether glycolate and LDH nanoparticles (FIG. 2A) and with surfactant SDS, ethoxylated ammonium lauryl ether glycolate and LDH nanoparticles (FIG. 2B). All components of the sample of FIG. 2B are at the same concentration as the components of the sample of FIG. 2A.
Figure 2B:
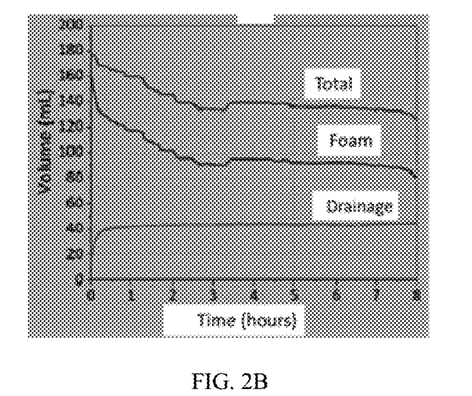

The use of fatty acid as a surfactant plays an important role in lowering the surface tension of the liquid and accordingly increasing the foam volume and stability as compared, for example, with the surfactant sodium dodecyl sulfate (SDS), as seen in FIGS. 2A and 2B, which compares the stability of foams made of SDS with those made of palmitic acid. Stability of the foam volume increases with time and there is also less drainage of the liquid phase for samples whose formulations differ only by the nature of the surfactant.

The better performance of the palmitic acid containing formulation is explained by the gradual increase in viscosity and elastic modulus (FIG. 3) over time, which contributes to a greater stabilization of the foam. Viscosity of the sample reaches a plateau after about 6 h.

Figure 3:
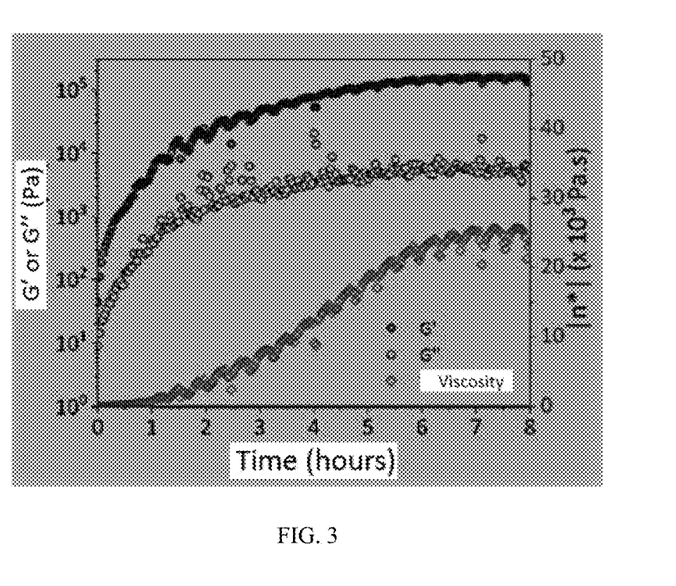
FIG. 3 shows the progression with time of the elastic modulus G', the loss modulus G" and the viscosity for the sample containing surfactant ammonium palmitate, ethoxylated ammonium lauryl ether glycolate and LDH nanoparticles.
Figure 4A:
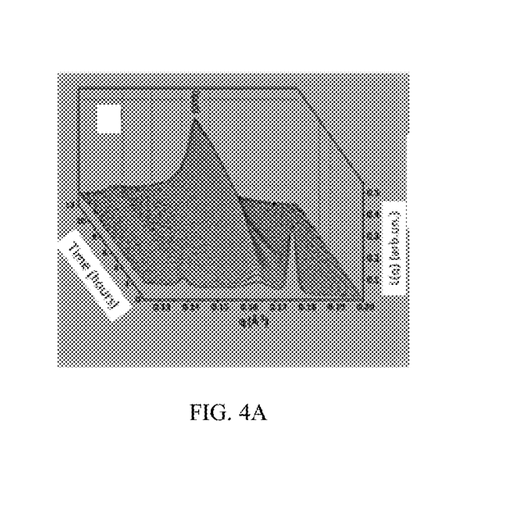
FIGS. 4A and 4B shows the SAXS diagrams of the intercalation kinetics of palmitate ion between the LDH lamellae (FIG. 4A) 3D graph (FIG. 4B) 2D graph.
Figure 4B:
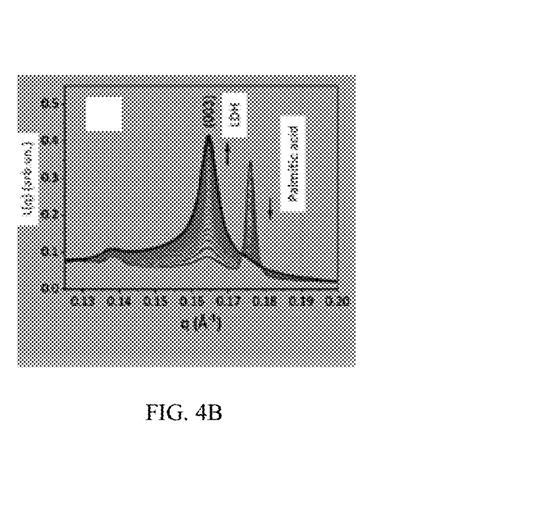

FIGS. 4A and 4B show the X-ray diffraction patterns monitored by SAXS (in 3D and 2D) for the foam formulation containing palmitate ion and LDH. Two peaks at q(Å$^{-1}$)=0.175 and 0.165 Å$^{-1}$ are seen, where intensity of the first peak decreases over time while that of the second peak increases. The initial peak position matches the distance between the LDH lamellae intercalated with counterions (Cl$^-$ or NO$_3^-$), on the other hand, values of the peak of increasing intensity match the distance between the lamellae containing an intercalated double layer of the palmitate ion. Progression of such an ion exchange process asymptotically tends to a steady state after 6 h, which is very close to the equilibrium reached by viscosity (FIG. 3). Therefore, the increased viscosity can be explained by the expansion of the volume of LDH particles caused by the ion exchange of Cl$^-$ and/or NO$_3^-$ ions initially present with fatty acid ions. Such a substitution does not happen with the formulation containing SDS surfactant. This specific stabilization behavior of the foam containing both LDH and surfactant based on fatty acid demonstrates the inventive step and novelty of the present invention.

Temperature Stability Test of the LDH Containing Foam

Figure 5A:
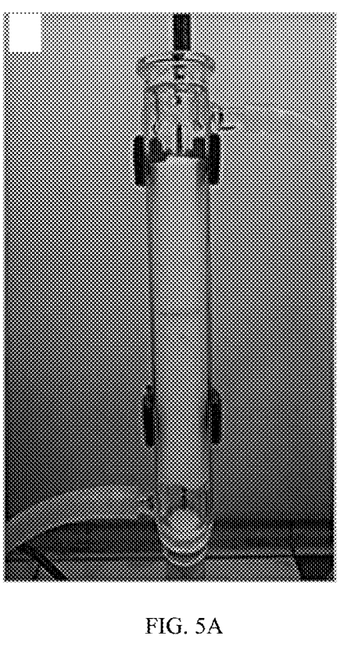
FIGS. 5A and 5B shows the structural stability and plugging ability of the foam made of the formulation containing triethanolammonium palmitate, ethoxylated triethanolammonium lauryl ether glycolate kept at 60° C.
Figure 5B:
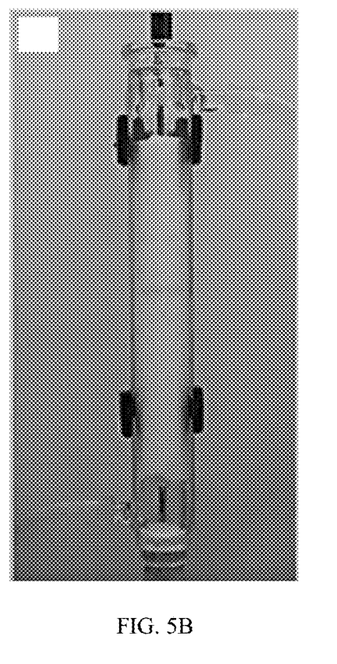

A foam sample made with palmitic acid, Laureth-11, triethanolamine and 1.5% LDH was applied in a thermostat glass tube, which allowed to assess foam stability as a function of time and temperature. The images in FIGS. 5A and 5B illustrate stability of the foam kept at 60° C. for 8 h, demonstrating its potential as a pipe plugging device during hot maintenance work.

Plugging Capacity and Flammability Test

The foam of the present invention was applied to the central part of a steel tube of 1 m in length and 4" in diameter (FIGS. 6A to 6C), forming a block of 15 cm in length (approximately), having on one side of the tube an inert atmosphere and on the other side an explosive atmosphere with application on the tube walls of a mixture of gasoline and diesel (ratio 1:1). The tube ends were sealed and after 1 h the seals were removed and the (supposedly) inert tube end was exposed to the flame (FIG. 7). In this procedure, no occurrence of fire or explosion was seen. Then, the end contaminated with the explosive atmosphere was also exposed to the flame, causing the explosive atmosphere to fire (FIGS. 8A to 8F) without flame propagation through the foam plug, proving its ability to plug an explosive atmosphere.

Figure 6A:
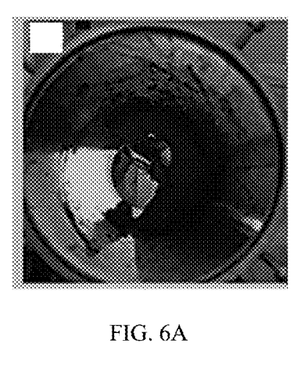
FIGS. 6A, 6B, and 6C show the sequence of application of the foam plug in the steel pipe, with one side of the pipe having an explosive atmosphere generated by a mixture of volatile hydrocarbons and the other side of the pipe being hydrocarbon-free.
Figure 6B:
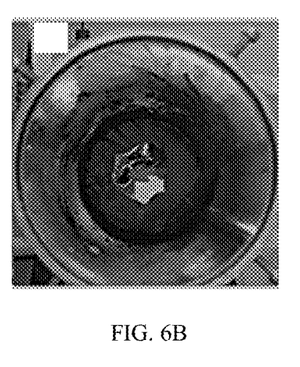
Figure 6C:
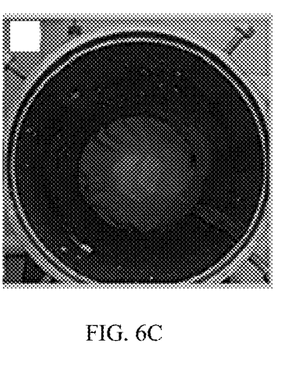
Figure 7:
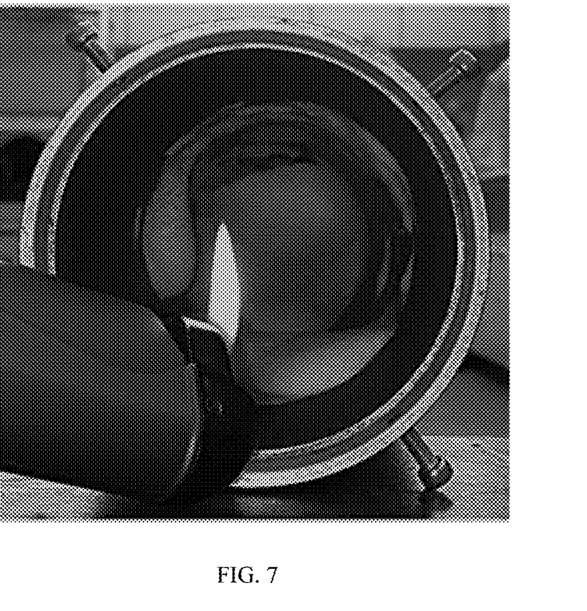
FIG. 7 shows the flammability test on the pipe side with no explosive atmosphere.
Figure 8A:
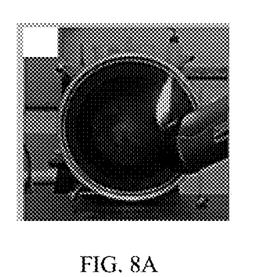
FIGS. 8A-8F show the sequence of flame propagation in the flammability test on the side of the pipe containing an explosive atmosphere. Exposure to flame (FIG. 8A), occurrence of explosion (FIGS. 8B and 8C), termination of explosion (FIGS. 8D and 8E), foam after explosion (FIG. 8f). The sequence has a time interval of about 0.2 s.
Figure 8B:
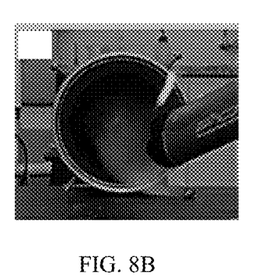
Figure 8C:
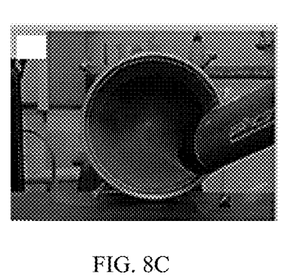
Figure 8D:
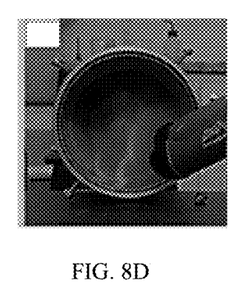
Figure 8E:
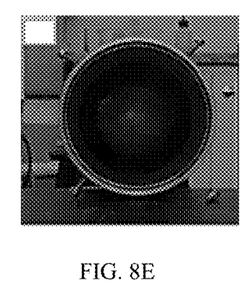
Figure 8F:
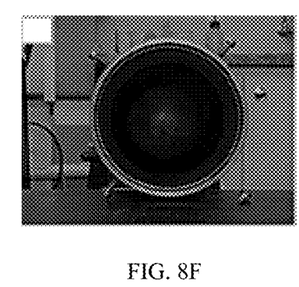

An advantage of the foam of the present invention is its ease of application, as seen in FIGS. 6A to 6C.

Another great advantage of this foam is its plugging ability, separating the inert atmosphere (FIG. 7) from the explosive atmosphere (FIGS. 8A to 8F), resistance to pressure differences of up to 0.1 bar and resistance to explosions, as seen in FIGS. 8A to 8F, where the foam remains intact after the explosion.

The scope and contents of the present invention are not construed to be limited by the aforementioned applications, but by the terms defined in the claims and equivalents thereof.

The invention claimed is:

1. A foam formulation characterized in that it comprises a surfactant or a mixture of surfactants, a co-surfactant or a mixture of co-surfactants, a base or a mixture of bases and LDH nanoparticles.

2. The foam formulation according to claim 1 characterized in that the surfactant belongs to the class of fatty acids of the $C_mH_nCOOH$ type, where $15 \leq m \leq 17$ and $31 \leq n \leq 33$, such as palmitic acid, stearic acid, linoleic acid, oleic acid and linolenic acid, or a mixture thereof or other equivalent substances.

3. The foam formulation according to claims 1 and 2 characterized in that the fatty acid preferably has a concentration between 0.09 and 0.54 mol·L$^{-1}$, more preferably between 0.15 and 0.40 mol·L$^{-1}$, most preferably between 0.20 and 0.30 mol·L$^{-1}$.

4. The foam formulation according to claim 1 characterized in that the co-surfactant belongs to the class of ethoxylated lauryl ether alcohols or glycolic acids of the $R_1C_xH_y(C_2H_4O)_zR_2$ type, where $12 \leq x \leq 16$, $27 \leq y \leq 31$, $10 \leq z \leq 21$, $R_1$ being H or O and $R_2$ being the alcohol, carboxylic acid or ether function ($-CH_2OH$, $-CH_2COOH$ or $-OC_2H_5$), such as Laureth-11, Brij-58, Brij-56, Laureth-23, a mixture thereof or similar.

5. The foam formulation according to any one of claims 1 to 4 characterized in that the co-surfactant ethoxylated hydrocarbon alcohol or acid has a concentration preferably between 0.001 and 0.060 mol·L$^{-1}$, more preferably between 0.005 and 0.020 mol·L$^{-1}$, most preferably between 0.008 and 0.012 mol·L$^{-1}$.

6. The foam formulation according to claim 1 characterized in that the base is a strong, moderately strong or weak base, such as sodium hydroxide, ammonium hydroxide or triethanolamine, or a mixture thereof or the like.

7. The foam formulation according to any one of claims 1 to 6 characterized in that the base has a concentration preferably between 0.009 and 0.84 mol·$L^{-1}$, more preferably between 0.018 and 0.36 mol·$L^{-1}$, most preferably between 0.02 and 0.30 mol·$L^{-1}$.

8. The foam formulation according to claim 1 characterized in that the nanoparticles belong to the class of lamellar double hydroxides, which can be made of lamellae of a mixture of aluminum oxyhydroxide, zinc oxyhydroxide and their counterions or they can also be composed of a mixture of aluminum, nickel and magnesium oxyhydroxide, or any other LDH-forming mixtures whose lamellae surface has a positive charge.

9. The foam formulation according to any one of claims 1 to 8 characterized in that the LDH concentration ranges, preferably from 0.5 to 3% (w/w), more preferably from 1 to 2%, most preferably from 1.25 to 1.75%.

* * * * *